Patented Mar. 3, 1925.

1,528,543

UNITED STATES PATENT OFFICE.

MINER L. HARTMANN, OF NIAGARA FALLS, NEW YORK, ASSIGNOR TO THE CARBORUNDUM COMPANY, OF NIAGARA FALLS, NEW YORK, A CORPORATION OF PENNSYLVANIA.

PROCESS OF MAKING CRYSTALLINE MINERAL PARTICLES.

No Drawing.     Application filed September 6, 1923. Serial No. 661,334.

*To all whom it may concern:*

Be it known that I, MINER L. HARTMANN, a citizen of the United States, residing at Niagara Falls, in the county of Niagara and State of New York, have invented a new and useful Improvement in Processes of Making Crystalline Mineral Particles, of which the following is a full, clear, and exact description.

The present invention relates to a new process for treating the surfaces of crystalline mineral materials, and an object thereof is to scratch and roughen the grain surfaces and thus increase their bonding qualities. Another object of my invention is to produce abrasive grains with dull or rounded edges and points. Still another object of my invention is to cause the grains to pack together better, that is, to increase the apparent density of the mass of grains.

This treatment is suitable for a large number of natural and artificial abrasives and refractory materials, such as silicon carbide, fused crystalline alumina abrasives and naturally occurring crystalline minerals such as corundum, emery, garnet, quartz, silica sand and the like, and in the following description and claims, the term "crystalline mineral materals" is to be understood to include these materials.

I have discovered that by the method described below the more or less smooth surfaces of crystalline mineral grains may be scratched and roughened, so that bonding materials such as glue, shellac, rubber, cement, and ceramic bonds adhere much more firmly to the grain surfaces than before such treatment. In certain abrasive operations, grains with dull points and edges have been found to be preferred to sharp grains, and my new process also accomplishes this result.

Briefly it consists in subjecting the particles of crystalline mineral material to the scratching or roughening action of other similar particles or of other or harder particles.

As an illustration of a preferred method of practicing my invention, I take particles about $\frac{1}{16}''$ in diameter made by crushing the homogeneous fused aluminous material such as produced, for example, by the method described in United States Letters Patent No. 906,339, to Frank J. Tone, granted December 8, 1908, and mix therewith a lesser portion of silicon carbide particles, which are preferably finer than the alumina particles. Fused alumina particles of about twenty mesh may satisfactorily be treated according to my process with one hundred and twenty mesh silicon carbide powder. The mixture is then tumbled or rolled over and over until the desired scratching effect has been attained. The silicon carbide and the dust are removed by a simple screening operation or otherwise as desired. Fused alumina grains as treated above for seventy hours are visibly scratched and the sharp points and edges are distinctly dulled. Moreover, the weight per cubic foot is increased from one hundred and twenty-eight pounds to one hundred and thirty-four pounds, and the strength of adhesion between the alumina particles and the bonding materials is greatly increased. For example, the strength of adhesion between such particles and glue is increased approximately fourfold.

While in the above illustrative example fused alumina and silicon carbide have been specifically mentioned, I do not restrict myself to these materials, as any granular mineral abrasive materials may be treated by the method described with the same results. Although I prefer to use finer particles of a harder material for the abrading agent, this is not necessary since good results may be accomplished by the attritional action of similar particles.

I claim:

1. The process of treating crystalline mineral particles comprising mixing with such particles other hard particles and agitating the mass to scratch and roughen the crystalline mineral particles.

2. The process of treating crystalline mineral particles comprising mixing with such particles other hard particles of different material and agitating the mass to scratch and roughen the crystalline mineral particles.

3. The process of treating crystalline mineral particles comprising mixing with such particles harder crystalline particles and agitating the mass to scratch and roughen the crystalline mineral particles.

4. The process of treating crystalline mineral particles comprising mixing with such particles silicon carbide and agitating the mass to scratch and roughen the crystalline mineral particles.

5. The process of treating fused aluminous abrasive particles comprising subjecting them to the scratching and roughening action of silicon carbide particles.

6. The process of treating fused aluminous abrasive particles comprising subjecting them to the scratching and roughening action of finer particles of silicon carbide.

7. The process of treating crystalline mineral particles comprising mixing with such particles other hard particles which do not exceed in size the particles being treated and agitating the mass to scratch and roughen the crystalline mineral particles.

8. The process of treating crystalline mineral particles comprising mixing with such particles other hard particles of smaller size than the particles being treated and agitating the mass to scratch and roughen the crystalline mineral particles.

9. The process of treating crystalline mineral particles comprising mixing with such particles a lesser portion of other hard particles and agitating the mass to scratch and roughen the crystalline mineral particles.

10. The process of treating crystalline mineral particles comprising mixing with such particles a lesser portion of other hard and finer particles and agitating the mass to scratch and roughen the crystalline mineral particles.

In testimony whereof I have hereunto set my hand.

MINER L. HARTMANN.